United States Patent Office 2,741,579
Patented Apr. 10, 1956

2,741,579

INHIBITING POLYMERIZATION OF FURFURAL

Sherwood C. Samuels, Jr., Bartlesville, Okla., assignor to Phillips Petroleum Company, a corporation of Delaware No Drawing. Application July 20, 1950, Serial No. 175,009

24 Claims. (Cl. 196—14.26)

This invention relates to a method for inhibiting the polymerization of furfural. In one embodiment this invention relates to an improved solvent extraction process. In another embodiment it relates to the utilization of selected organic thiocyanates for preventing or greatly retarding the formation of polymeric substances in furfural solvents, employed in various commercial processes. The present invention is particularly concerned with inhibiting polymerization of furfural when utilized as a selective solvent in a gas-oil solvent extraction process.

Solvent extraction refers to the separation of components of a mixture, usually a liquid solution, by treatment with an immiscible solvent in which one or more of the components of the mixture are more soluble than another. Solvent extraction is widely applied in the separation of compounds differing in chemical type, which are difficult to separate by distillation because their volatilities do not differ greatly. Solvent extraction involves the three steps of first, bringing solvent and mixture into intimate contact; second, separation of resulting phases; and third, separation and recovery of solvent and product from each phase, usually by distillation. Contacting may be accomplished in any of several types of equipment used in the art, such as agitated vessels containing the liquid, plate columns, impinging jets of the two liquid streams, vessels with stirring means, packed towers, or the like. After separation of the phases, the solvent is usually recovered by distillation of the solvent-rich layer, termed the "extract" and of the solvent-lean layer termed the "raffinate."

The use of furfural as a solvent in numerous commercial solvent extraction processes is well-known. In the refining of lubricating oils, for example, undesirable olefinic and diolefinic hydrocarbon constituents can be separated from the paraffinic and naphthenic hydrocarbons through the use of furfural. Furfural has also been used as a selective solvent in the separation of olefins and aromatics from catalytic gas oils, or in the separation of aromatics from paraffins and naphthenes in a virgin gas oil. Furfural has also come into extensive use in extractive distillation processes wherein the volatilities of close boiling compounds are altered sufficiently to enable separations to be effected satisfactorily in commercial fractionators or super fractionators. Thus, from a $C_4$ hydrocarbon fraction produced in refinery operations, such as catalytic or thermal cracking, there may be obtained streams of substantially pure n-butene, butadiene, and olefin-free normal and isobutane streams.

In extractive distillation, solvent extraction is combined with continuous fractional distillation, the furfural being supplied continuously to the top of the column and descending therein and the hydrocarbon feed being supplied to an intermediate point in the column and being vaporized upwardly countercurrently to the furfural, there being provided the usual bubble trays or packing, a reboiler at the bottom of the column and means for condensing overhead vapors and of turning condensate as reflux to the top of the column. The separation of butadiene in this manner is described in U. S. Patents 2,415,006 and 2,434,796 to K. H. Hackmuth.

In solvent extraction of normally liquid hydrocarbon materials such as a gas oil, one method of operation involves countercurrently contacting the hydrocarbon liquid with furfural as the selective solvent and withdrawing an extract phase from a point in the lower portion of the extraction zone, and a raffinate phase from an upper point thereof, and recovery of solvent and product from each separate phase by distillation. In other instances the solvent-hydrocarbon mixture can be maintained in a stirred vessel or agitated by other means under the requisite contacting conditions, and the resulting contacting mixture allowed to settle to permit recovery of separate raffinate and extract phases and recovery of lean furfural and product from each phase.

In the various commercial processes utilizing the selective solvent extraction of furfural, elevated temperatures are maintained over an extended period as the solvent circulates throughout the process system. While furfural is known to darken fairly rapidly when stored at atmospheric temperatures, with the resultant formation of tarry or resinous polymerization products, the formation of such polymeric materials is greatly accelerated as the temperature is increased. In commercial solvent extraction systems utilizing furfural, temperatures as high as from about 100 to 400° F., or higher, are often employed, the temperatures in the upper parts of that range more generally being employed in the extract and raffinate distillation steps. The formation of tarry polymeric materials is thereby promoted, which materials often accumulate in vital parts of the equipment, such as valves, pumps, heat exchange tubes, and the like, thus seriously interfering with flow and operation of the process. In extreme cases, polymer formation may occur to such an extent as to block the lines. In addition to operational difficulties, the selectivity of the solvent when containing such polymeric materials is markedly decreased, and may render the desired separation unsatisfactory or even impossible. Also, the cost of replacing the solvent lost to polymer formation often becomes a major factor in the total operating cost, and may be sufficient to render the process commercially unattractive.

My invention is concerned with the utilization of furfural as a selective solvent in the solvent extraction of hydrocarbon mixtures wherein complete or partial elimination of polymer formation is accomplished, thereby providing for longer operating periods, a more efficient utilization of furfural, and for a more efficient separation of hydrocarbon components.

The nature of the polymeric materials formed in furfural when subjected to elevated temperatures, as when utilized as a selective solvent, are not clearly understood. However, these materials are furfural degradation products, are largely polymeric, and probably contain some condensation products. They are heavier than furfural, i. e., have a higher molecular weight. Accordingly, when using the term "polymer" or "polymeric material" herein to designate the furfural degradation products formed in the furfural, it will be understood that all such degradation materials are being referred to, even though they may not all, in a strict sense of the word, be polymeric.

An object of my invention is to provide a method for inhibiting the formation of high boiling resins, tars, and other non-volatile polymeric materials in furfural.

Another object is to provide a means for reducing the accumulation of heavy tarry materials in a furfural solvent extraction system.

It is another object to inhibit the formation of polymeric materials in furfural when utilized as a selective solvent in a hydrocarbon oil solvent extraction process.

It is another object to provide alkyl thiocyanates as inhibitors of furfural polymerization.

It is another object to provide new and novel selective solvents.

Other objects and advantages will be apparent to those skilled in the art from the accompanying discussion and disclosure.

I have discovered that polymer formation in furfural can be greatly retarded by the addition to the furfural of small amounts of an aklyl thiocyanate. The preferred thiocyanates are those containing from 1 to 4 carbon atoms in the alkyl radical, viz, methyl thiocyanate, ethyl thiocyanate, n-propyl thiocyanate, isopropyl thiocyanate, n-butyl thiocyanate, and isobutyl thiocyanate.

These inhibitor materials are liquids having boiling points within the range of about 266 to 365° F. and can be added to the solvent extraction system in any desired manner, generally, dissolved in furfural in the presence of a liquid hydrocarbon, as discussed hereafter. If desired, the inhibiting material can be added with an oil feed stream to the extraction zone. However, my process provides for recyciing the inhibitor together with lean furfural from a furfural recovery step to the extraction zone, and accordingly, the introduction of inhibiting materials to the extraction zone in any other manner need only to be concerned with supplying fresh or make-up inhibitor.

In accordance with my invention, the formation of polymeric materials in furfural, when utilized as a selective solvent in a hydrocarbon solvent extraction process, is inhibited by maintaining an alkyl thiocyanate of the type described in the process system in a proportion of from about 0.01 to 0.2 weight per cent, based on the fufural therein. The formation of polymeric materials in the furfural solvent is completely inhibited or greatly reduced at temperatures as high as 500° F. The process of my invention is conducted in the absence of free oxygen. My invention can be applied to any process utilizing furfural in the solvent extraction, or in the extractive distillation of a hydrocarbon mixture.

I have found that it is important that the furfural at all times contain at least from 0.4 to 2 per cent of its weight of a hydrocarbon material. This is important for the reason that furfural, to which has been added a small amount of an alkyl thiocyanate, such as that amount utilized as an inhibitor in my process, exhibits a tendency to set up into a gel-like mass upon being maintained at solvent extraction temperatures over prolonged periods, i. e., temperatures of from about 100 to 400° F. or higher. I have found that at such temperatures furfural containing at least from 0.01 to 0.2 weight per cent of an alkyl thiocyanate inhibitor of my invention will set up to a gel-like mass when maintained at elevated temperatures, i. e., 100 to 400° F. or higher, for a period of from 8 to 12 hours. Such a tendency, of course, is highly undesirable, since in commercial practice the accumulation of such gel-like materials in any part of the process system would cause plugging of lines and/or vessels in the system, and necessitating loss of time for shutdown of the system, for removal of the gel-like mass. The formation and accumulation of gel-like materials in the process system is prevented by maintaining incorporated in the furfural at all times from 0.4 to 2.0 weight per cent of a hydrocarbon material. Accordingly, it is necessary that the preferred selective solvent of my invention consist essentially of not only furfural and the inhibitor material, but also from 0.4 to 2 per cent of a hydrocarbon material based on the weight of the furfural. Such a hydrocarbon preferably boils in a range of about 275 to 375° F., since that boiling range permits it to be easily taken overhead with lean furfural during the distillation of the extract or raffinate phase. Obviously, if the hydrocarbon liquid being treated contains hydrocarbon components boiling in a range such that they can be distilled with furfural from a recovery step as above discussed, addition of a hydrocarbon for such purpose to the process system is unnecessary. The addition of a hydrocarbon or a narrow boiling range hydrocarbon fraction in this manner is particularly advantageous in the solvent extraction of hydrocarbons having boiling ranges appreciably below or above the boiling point of furfural, such as when solvent extracting a heavy gas oil, or in the extractive distillation of a $C_4$ hydrocarbon mixture. Preferably, such a hydrocarbon is aromatic, or the narrow boiling range hydrocarbon fraction comprises aromatic hydrocarbons in a major proportion.

If desired, the minimum content of hydrocarbon can be maintained in the furfural solvent by recycling a portion of hydrocarbon recovered from the extract distillation kettle product to the lean furfural-inhibitor stream withdrawn from the extract distillation.

In one embodiment of my invention, a catalytic gas oil having a boiling range above about 500° F., often within the limits of 600 to 850° F., is contacted with furfural containing from 0.01 to 0.2 weight per cent of an alkyl thiocyanate inhibitor, already described, in a volume ratio of gas oil to furfural within the limits of about 0.5:1 to 2:1, although a ratio outside these limits can be utilized when desired. The lean furfural prior to its contact with the gas oil feed stream preferably contains the inhibitor together with at least 0.4 per cent by weight of a hydrocarbon, preferably a liquid aromatic hydrocarbon boiling in a range of about 275 to 375° F. The resulting furfural-oil admixture is then maintained in a state of agitation under selected conditions of temperature and pressure suitable for selectively dissolving unsaturates and aromatic hydrocarbons from the oil into the solvent. Generally, a temperature in the range of from 100 to 250° F. or as high as 350° F. can be utilized in the solvent extraction zone, although it is preferred to utilize an extraction temperature generally within the limits of about 125 and 175° F. Pressures employed are, of course, dependent on the selected solvent extraction temperature, it being preferred generally to select operating conditions utilizing a pressure of from atmospheric to 50 p. s. i. g. After contacting the solvent and oil, the system is allowed to settle to form separate extract and raffinate phases.

Extract phase, rich in furfural and aromatic and unsaturated hydrocarbons, is distilled to separate furfural from the oil dissolved therein by conventional extract distillation. The overhead extract distillation temperature is preferably about 325 to 375° F. under which conditions the kettle temperature may be as high as 400° F., and in some cases higher. The raffinate distillation overhead temperature is also preferably about 325 to 375° F., and furfural therein may in some cases be heated to a temperature approaching 500° F., or in some cases higher. Preferably, raffinate and extract distillation conditions are regulated to provide overhead lean furfural as an overhead product containing not only the inhibitor material, which distills overhead therewith, but also an amount of hydrocarbon in a concentration above at least 0.4 weight per cent of the furfural. It is to be understood that if desired the lean furfural recovered from either the raffinate or extract, or both, need not necessarily contain hydrocarbon in the minimum concentration discussed above. However, it is highly desirable that the furfural in the system contain at least from 0.4 to 2 per cent by weight of a hydrocarbon material, thus eliminating any formation of gel-like material in the lines and vessels intermediate the solvent recovery zone and the extraction zone.

The hydrocarbon present in the lean furfural overhead stream is one having been added to the extraction system, or comprises at least one or more components in the fresh oil feed stream to the extraction zone, as discussed above.

In another embodiment, a light hydrocarbon fraction, such as a $C_4$ fraction containing unsaturates, is subjected to an extractive distillation utilizing the furfural solvent of my invention. In this case it is particularly advantageous that a hydrocarbon be added to the extraction system to prevent formation of gel-like materials. In this type operation a light hydrocarbon material is removed from the extract and raffinate phase as an overhead distillation product and the residual polymer-hydrocarbon-inhibitor material is recycled to the extraction zone. After a period of time, polymer begins to form in the furfural and must be removed, the rate of formation being many times lower than that which would occur had the inhibiting material of my invention not been present. The recovery of such polymeric materials is accomplished by a redistillation of a side stream of the recycled furfural to remove the furfural overhead together with inhibiting material and added hydrocarbon. The redistillation is controlled so as to remove furfural with inhibiting material and containing the added hydrocarbon so as to prevent the formation of a gel-like material in the overhead lean furfural-inhibitor thus recovered. Generally, such a redistillation is conducted at an overhead temperature of from 325 to 375° F., or higher, dependent upon the pressure utilized.

The addition of alkyl thiocyanates to the furfural solvent extraction system, as provided by my invention, will generally effect a reduction in the polymerization rate of furfural from 25 to as high as 70 to 90 per cent, and in some cases substantially complete reduction can be accomplished. Through the use of my inhibitors, the replacement costs of the furfural solvent are kept at a minimum. The inhibitor material is removed from the extract or raffinate phase together with lean furfural and recycled to the extraction zone, which affords a convenient and economical means for maintaining the concentration of inhibitor material in the extraction system.

The advantages of this invention are illustrated in the following example. The reactants and their proportions and their specific ingredients are presented as being typical and should not be construed to limit the invention unduly.

In the table following are presented data showing the amount of furfural loss observed, when equal volumes of freshly distilled furfural and an aromatic furfural extract of a recycle catalytic gas oil were maintained in a sealed stainless steel bomb, together with an alkyl thiocyanate inhibitor at 500° F., under varied conditions of time and inhibitor concentration.

Also included in the table are comparative data showing the amount of furfural loss observed when no inhibitor was employed in the sealed system.

| Inhibitor | Hours @ 500° F. | Percent inhibitor in Bomb [1] | Furfural Loss [2] |
| --- | --- | --- | --- |
| Ethyl thiocyanate | 6 | 0.05 | 3.0 |
|  |  | 0.10 | 3.6 |
|  |  | 0.5 | 7.1 |
|  | 12 | 0.05 | 5.5 |
|  |  | 0.10 | 7.9 |
| n-Butyl thiocyanate | 6 | 0.05 | 4.2 |
| None | 6 |  | 5.4 |
|  | 12 |  | 9.6 |

[1] Based on weight of furfural present.
[2] Loss of furfural to condensation and polymerization.

The data in the table above illustrate the strong effect of ethyl thiocyanate and n-butyl thiocyanate as inhibitors of furfural polymerization. These data are further illustrative of the fact that concentration of inhibitor as high as 0.5 per cent accelerate polymer formation in the furfural.

As will be evident to those skilled in the art, various modifications can be made or followed, in the light of the foregoing disclosure and discussion, without departing from the spirit or scope of the disclosure or from the scope of the claims.

I claim:

1. An improved selective solvent comprising furfural in intimate admixture with at least 0.4 per cent of its weight of a normally liquid hydrocarbon and from 0.01 to 0.2 per cent of its weight of an alkyl thiocyanate containing from 1 to 4 carbon atoms in the alkyl radical.

2. In a process for subjecting a mixture of hydrocarbons differing in chemical type to selective solvent action of furfural to separate one said hydrocarbon type from another, the improvement comprising maintaining incorporated in said furfural at least 0.4 per cent of its weight of a normally liquid hydrocarbon and from 0.01 to 0.2 per cent of its weight of an alkyl thiocyanate containing from 1 to 4 carbon atoms in the alkyl radical as a furfural polymerization inhibitor.

3. In a process for separating an unsaturated hydrocarbon from more saturated hydrocarbons by solvent extraction utilizing furfural as a selective solvent, in which furfural is maintained at a temperature within the limits of 100 and 350° F. and normally undergoes polymerization under such conditions, the improvement which comprises maintaining incorporated in said furfural at least 0.4 per cent of its weight of a normally liquid hydrocarbon and from 0.01 to 0.2 per cent of its weight of an alkyl thiocyanate containing from 1 to 4 carbon atoms in the alkyl radical.

4. In the extractive distillation of aliphatic $C_4$ hydrocarbons containing unsaturated $C_4$ hydrocarbons in admixture with more saturated $C_4$ hydrocarbons using furfural as the selective solvent, at a temperature within the limits of 200 and 325° F., the improvement comprising inhibiting polymerization of the furfural by maintaining incorporated therein at least 0.4 per cent of its weight of a normally liquid hydrocarbon and from 0.01 to 0.2 per cent of its weight of an alkyl thiocyanate containing from 1 to 4 carbon atoms in the alkyl radical.

5. A method for inhibiting the polymerization of furfural at a temperature within the limits of from 100 to 500° F. comprising maintaining incorporated in said furfural from 0.01 to 0.2 per cent of its weight of an alkyl thiocyanate containing from 1 to 4 carbon atoms in the molecule together with from at least 0.4 to 2 per cent of its weight of a normally liquid hydrocarbon.

6. A process for the solvent extraction of aromatic and unsaturated hydrocarbons from a catalytic gas oil having a boiling range above 500° F., comprising contacting said gas oil with furfural in a volume ratio to said furfural within the limits of 0.5:1 to 2:1 in the presence of from 0.01 to 0.2 per cent of a n-alkyl thiocyanate having from 1 to 4 carbon atoms in the alkyl radical, based on the weight of said furfural, at a temperature within the limits of 100 to 350° F., recovering a separate extract phase from the zone of said contacting, passing said extract phase to an extract distillation zone and therein distilling same to produce lean furfural as an overhead distillation product containing said n-alkyl thiocyanate, maintaining incorporated in lean furfural thus produced at least from 0.4 to 2 per cent of its weight of a liquid hydrocarbon boiling in the range of 275 to 375° F., recycling the resulting mixture of said liquid hydrocarbon, n-alkyl thiocyanate, and lean furfural to the zone of said contacting, and recovering said unsaturates and aromatic hydrocarbons from said distillation zone as products of the process.

7. The process of claim 6 wherein said liquid hydrocarbon is introduced into the process system and continuously recycled from the zone of solvent extraction through said extract distillation as overhead distillation product with lean furfural and back to said solvent extraction.

8. In a process for subjecting a hydrocarbon oil containing hydrocarbons differing in chemical type to solvent extraction utilizing furfural as a selective solvent to separate one said hydrocarbon type from another, said oil containing hydrocarbon components boiling in the range of 275 to 375° F., the improvement comprising contacting said oil with furfural in a volume ratio to said furfural within the limits of 0.5:1 to 2:1 in the presence of from 0.01 to 0.2 per cent of an alkyl thiocyanate containing from 1 to 4 carbon atoms in the alkyl radical, based on the weight of said furfural, at a temperature within the limits of 100 and 350° F., recovering a separate extract phase from the zone of said contacting, distilling extract phase thus recovered to produce lean furfural containing said alkyl thiocyanate and at least 0.4 per cent of its weight of said hydrocarbon components as overhead distillation product, recycling the resulting overhead distillation product to the zone of said contacting, and recovering furfural-free extract from the zone of said distilling.

9. In a process for subjecting a hydrocarbon mixture containing hydrocarbons differing in chemical type to selective solvent action of furfural to separate one said hydrocarbon type from another, the improvement comprising maintaining incorporated in said furfural at least 0.4 per cent of its weight of a normally liquid hydrocarbon and from 0.01 to 0.2 per cent of its weight of ethyl thiocyanate.

10. In a process for subjecting a hydrocarbon mixture containing hydrocarbons differing in chemical type to selective solvent action of furfural to separate one said hydrocarbon type from another, the improvement comprising maintaining incorporated in said furfural at least 0.4 per cent of its weight of a normally liquid hydrocarbon and from 0.01 to 0.2 per cent of its weight of n-butyl thiocyanate.

11. The process of claim 6 wherein said liquid hydrocarbon is a portion of furfural-free extract recovered from the zone of said distilling and is recycled to the stream of lean furfural withdrawn from said distillation zone.

12. The process of claim 6 wherein said liquid hydrocarbon contains aromatic hydrocarbons in a major proportion.

13. An improved selective solvent comprising furfural in intimate admixture with at least 0.4 per cent of its weight of a normally liquid hydrocarbon and from 0.01 to 0.2 per cent of its weight of an n-alkyl thiocyanate containing from 1 to 4 carbon atoms in the alkyl radical.

14. In a process which comprises subjecting a hydrocarbon mixture containing hydrocarbons differing in chemical types to selective solvent action of furfural to separate one said hydrocarbon type from another, the improvement comprising maintaining in said furfural from 0.01 to 0.2 per cent of its weight of an n-alkyl thiocyanate containing from 1 to 4 carbon atoms in the alkyl radical and also at least 0.4 per cent of its weight of an aromatic hydrocarbon fraction having a boiling range within the limits of 275 and 375° F.

15. An improved solvent of claim 13 wherein said normally liquid hydrocarbon comprises an aromatic hydrocarbon boiling within the range of 275–375° F.

16. An improved solvent of claim 13 wherein said alkyl thiocyanate is ethyl thiocyanate.

17. An improved solvent of claim 13 wherein said alkyl thiocyanate is n-butyl thiocyanate.

18. An improved solvent of claim 13 wherein said normally liquid hydrocarbon is a gas oil fraction containing aromatic hydrocarbons and having a boiling range within the limits of 275–375° F.

19. A method of claim 5 wherein said normally liquid hydrocarbon comprises an aromatic hydrocarbon boiling within the range of 275–375° F.

20. A method of claim 5 wherein said normally liquid hydrocarbon is a gas oil fraction containing aromatic hydrocarbons and having a boiling range within the limits of 275–375° F.

21. In a process for subjecting a mixture of hydrocarbons differing in chemical type to selective solvent action of furfural to separate one said hydrocarbon type from another, and wherein a resulting furfural-containing phase is distilled to separate furfural as an overhead product of distillation therefrom for recycle to the zone of said solvent action, the improvement comprising maintaining incorporated in said furfural at least 0.4 per cent of its weight of a normally liquid hydrocarbon having a boiling range within the limits of 275–375° F. and from 0.01 to 0.2 per cent of its weight of an alkyl thiocyanate, containing from 1 to 4 carbon atoms in the alkyl radical as furfural polymerization inhibitor, furfural from said distillation containing normally liquid hydrocarbon incorporated therein as described and alkyl thiocyanate inhibitor distilled overhead therewith, and recycling same as said recycled furfural to the zone of said solvent action.

22. An improved selective solvent comprising furfural containing a minor proportion of an alkyl thiocyanate together with at least 0.4 per cent of its weight of a normally liquid hydrocarbon.

23. In the solvent extraction of hydrocarbons from a hydrocarbon mixture employing furfural as a selective solvent, the improvement comprising maintaining incorporated in said selective solvent a minor proportion of an alkyl thiocyanate, and at least 0.4 per cent of its weight of a normally liquid hydrocarbon.

24. An improved selective solvent of claim 22 wherein said furfural contains from 0.01 to 0.2 per cent of its weight of said alkyl thiocyanate.

References Cited in the file of this patent

UNITED STATES PATENTS

| 2,108,390 | Price | Feb. 15, 1938 |
| 2,150,400 | Rosen | Mar. 14, 1939 |
| 2,440,451 | Schulze et al. | Apr. 27, 1948 |
| 2,473,750 | Hillyer et al. | June 21, 1949 |
| 2,485,071 | Schulze et al. | Oct. 18, 1949 |